United States Patent
Takeda et al.

(10) Patent No.: US 10,602,431 B2
(45) Date of Patent: Mar. 24, 2020

(54) USER TERMINAL, RADIO BASE STATION, AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/753,449

(22) PCT Filed: Aug. 19, 2016

(86) PCT No.: PCT/JP2016/074167
§ 371 (c)(1),
(2) Date: Feb. 19, 2018

(87) PCT Pub. No.: WO2017/033840
PCT Pub. Date: Mar. 2, 2017

(65) Prior Publication Data
US 2018/0249399 A1 Aug. 30, 2018

(30) Foreign Application Priority Data
Aug. 21, 2015 (JP) ................. 2015-164191

(51) Int. Cl.
*H04W 48/10* (2009.01)
*H04L 5/00* (2006.01)
(Continued)

(52) U.S. Cl.
CPC ............ *H04W 48/10* (2013.01); *H04L 5/001* (2013.01); *H04W 48/12* (2013.01); *H04W 72/0446* (2013.01); *H04L 27/2602* (2013.01)

(58) Field of Classification Search
CPC . H04W 48/10; H04W 48/12; H04W 72/0446; H04L 5/001; H04L 27/2602
See application file for complete search history.

(56) References Cited

U.S. PATENT DOCUMENTS 9,247,461 B2 1/2016 Kondo
2011/0258327 A1* 10/2011 Phan ................. H04W 76/14
709/227

(Continued)

FOREIGN PATENT DOCUMENTS

| EP | 2816858 A1 | 12/2014 |
|---|---|---|
| JP | 2012-235317 A | 11/2012 |
| JP | 2013-009442 A | 1/2013 |

OTHER PUBLICATIONS

Extended European Search Report issued for European Patent Application No. 16839187.8, dated Feb. 13, 2019 (8 pages).

(Continued)

*Primary Examiner* — Ajay Cattungal
(74) *Attorney, Agent, or Firm* — Osha Liang LLP

(57) ABSTRACT

To perform communication using a plurality of cells using different transmission time intervals (TTIs) in an appropriate manner, a user terminal includes a control section for controlling the communication using the plurality of cells including at least a first cell and a second cell using a shorter TTI than a TTI of the first cell, and a reception section for receiving information broadcasted from each of the first and second cells. The user terminal receives system information and/or paging information as the information broadcasted from each cell.

17 Claims, 11 Drawing Sheets

(51) Int. Cl.
*H04W 48/12* (2009.01)
*H04W 72/04* (2009.01)
*H04L 27/26* (2006.01)

(56) References Cited

U.S. PATENT DOCUMENTS

| | | | | |
|---|---|---|---|---|
| 2011/0263259 | A1* | 10/2011 | Yamagishi | H04W 36/0055 455/436 |
| 2012/0106480 | A1* | 5/2012 | Shimomura | H04W 24/06 370/329 |
| 2013/0059579 | A1* | 3/2013 | Uno | H04W 52/0229 455/434 |
| 2014/0057669 | A1* | 2/2014 | Takahashi | H04W 48/12 455/501 |
| 2014/0228041 | A1* | 8/2014 | Takahashi | H04W 48/10 455/450 |
| 2015/0230133 | A1* | 8/2015 | Aoyagi | H04W 68/12 455/443 |
| 2015/0312958 | A1* | 10/2015 | Cheng | H04B 7/0413 370/252 |
| 2016/0127969 | A1* | 5/2016 | Pao | H04W 48/20 455/437 |
| 2016/0309466 | A1* | 10/2016 | Chen | H04B 7/2628 |
| 2017/0094569 | A1* | 3/2017 | Urabayashi | H04W 36/00 |
| 2017/0251423 | A1* | 8/2017 | Lee | H04W 48/10 |
| 2018/0115394 | A1* | 4/2018 | Harada | H04L 1/1861 |
| 2018/0332605 | A1* | 11/2018 | Pelletier | H04W 72/1289 |

OTHER PUBLICATIONS

International Search Report issued in PCT/JP2016/074167 dated Nov. 1, 2016 (2 pages).
Written Opinion of the International Searching Authority issued in PCT/JP2016/074167 dated Nov. 1, 2016 (4 pages).
Qualcomm; "[66#8] LTE-UMTS: Inbound mobility to CSG cell from UMTS cell"; 3GPP TSG-RAN WG2#66bis, R2-093952; Los Angeles, USA; Jun. 29-Jul. 3, 2009 (10 pages).
NTT DOCOMO; "Common search space for SCG serving cell(s)"; 3GPP TSG RAN WG1 Meeting #78, R1-143220; Dresden, Germany; Aug. 18-22, 2014 (2 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

\* cited by examiner

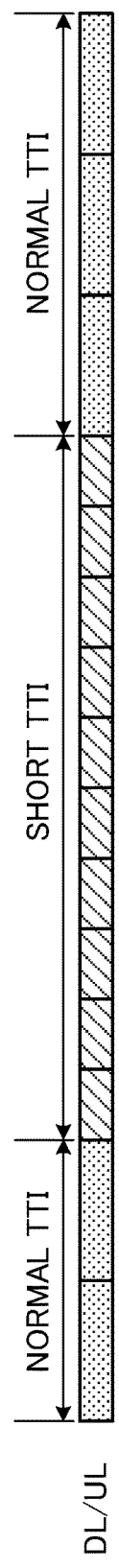
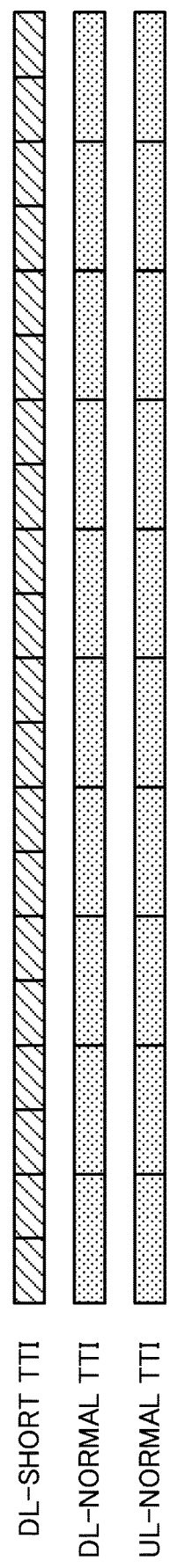
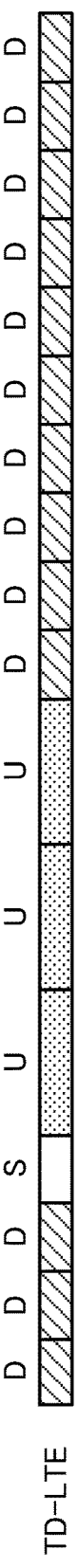

USER TERMINAL, RADIO BASE STATION, AND RADIO COMMUNICATION METHOD

BACKGROUND OF THE INVENTION

1. Field of the Invention

The present invention relates to a user terminal, a radio base station, and a radio communication method in next-generation mobile communication systems.

2. Description of Related Art

In Universal Mobile Telecommunications System (UMTS) networks, Long Term Evolution (LTE) has been specified for the purpose of providing increased data rates, reduced delay, and the like (non-patent document 1). To achieve further broadbandization and increased speed beyond LTE (also referred to as LTE Release 8), LTE-Advanced (also referred to as LTE Release 10, 11, or 12) is specified and successor systems thereto (e.g., LTE Release 13 and the like) are studied.

In LTE Releases 10 and 11, Carrier Aggregation (CA), which aggregates multiple component carriers (CCs), is introduced in order to achieve broadbandization. Each CCs is constituted in units of system bandwidths of LTE Release 8. In CA, the CCs from a single radio base station (eNodeB: eNB) are allocated to a user terminal (User Equipment: UE).

In LTE Release 12, Dual Connectivity (DC), which allocates multiple Cell Groups (CGs) from different radio base stations (eNBs) to a user terminal (UE), is introduced. Each CG is constituted of at least one cell (CC). Since DC aggregates the CCs from the different eNBs, DC is also referred to as Inter-eNB CA and the like.

In LTE Releases 8 to 12, a transmission time interval (TTI) is set at 1 ms in downlink (DL) and uplink (UL) transmissions between radio base stations and user terminals. In LTE systems (Releases 8 to 12), the TTI is also referred to as a subframe length.

Prior Art Document

Non-patent document 1: 3GPP TS 36.300 "Evolved Universal Terrestrial Radio Access (E-UTRA) and Evolved Universal Terrestrial Radio Access Network (E-UTRAN); Overall description; Stage 2"

Radio communication systems of LTE Release 13 or later, 5 G, and the like envision communication in high frequency bands of several tens of GHz, and communication of relatively small amounts of data such as Internet of Things (IoT), Machine Type Communication (MTC), and Machine To Machine (M2M). Applying a communication method (e.g., a TTI of 1 ms) of LTE Releases 8 to 12 to the future radio communication systems may be unable to offer sufficient communication services.

Thus, in the future radio communication systems, communication using short TTIs that are set shorter than 1 ms and/or different subcarrier intervals is considered. In this case, a user terminal may perform communication with a plurality of cells having different TTIs (for example, CA or DC). On the other hand, in the communication using the plurality of cells having different TTIs (TTI lengths), how to control communication becomes a problem.

SUMMARY OF THE INVENTION

Considering the above, one of objects of the present invention is to provide a user terminal, a radio base station, and a radio communication method that can perform communication using a plurality of cells using different TTIs in an appropriate manner.

A user terminal according to an aspect of the present invention includes a control section for controlling communication using a plurality of cells including at least a first cell and a second cell using a shorter transmission time interval (TTI) than a TTI of the first cell, and a reception section for receiving information from each of the first and second cells.

According to the present invention, communication using a plurality of cells using different TTIs can be performed in an appropriate manner.

BRIEF DESCRIPTION OF THE DRAWINGS

FIGS. 4A to 4C are drawings depicting examples of the configuration of normal TTIs and the short TTIs;

DETAILED DESCRIPTION OF THE INVENTION

Figure 1:
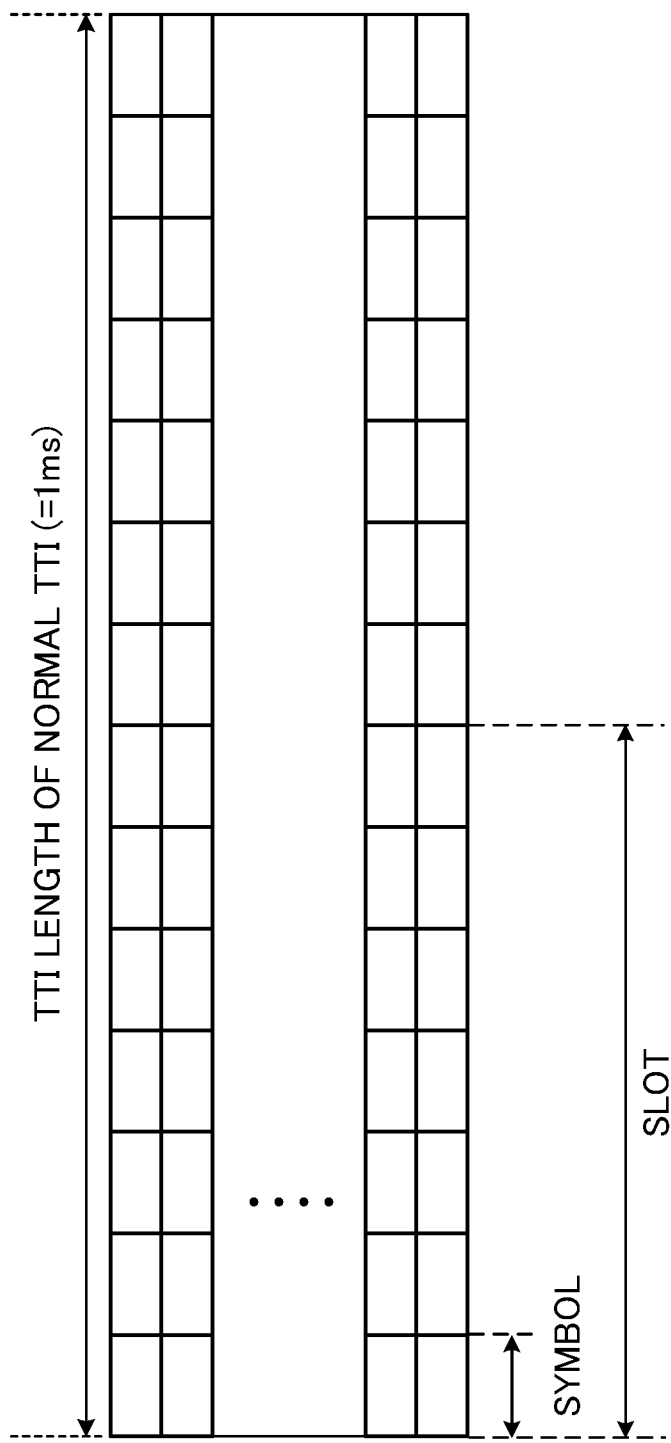
FIG. 1 is a drawing depicting an example of a transmission time interval (TTI) in existing LTE systems (Releases 8 to 12)

FIG. 1 is an explanatory view of an example of a transmission time interval (TTI) in LTE Releases 8 to 12. As depicted in FIG. 1, in LTE Releases 8 to 12, the TTI (hereinafter referred to as "normal TTI") has a time length of 1 ms. The normal TTI is also referred to as a subframe. The normal TTI is constituted of two time slots. The normal TTI is a transmission time unit of one channel-coded data packet (transport block), and is a processing section of scheduling, link adaptation, and the like.

As depicted in FIG. 1, when using normal cyclic prefixes (CPs) in a downlink (DL), the normal TTI is constituted of fourteen orthogonal frequency division multiplexing (OFDM) symbols (seven OFDM symbols per slot). Each OFDM symbol has a time length (symbol length) of 66.7 μs, and a normal CP of 4.76 μs is added thereto. Since a subcarrier interval is the reciprocal of the symbol length, when the symbol length is 66.7 μs, the subcarrier interval is 15 kHz.

In an uplink (UL) using the normal cyclic prefixes (CPs), the normal TTI is constituted of fourteen single carrier frequency division multiple access (SC-FDMA) symbols (seven SC-FDMA symbols per slot). Each SC-FDMA symbol has a time length (symbol length) of 66.7 μs, and a normal CP of 4.76 μs is added thereto. Since a subcarrier interval is the reciprocal of the symbol length, when the symbol length is 66.7 μs, the subcarrier interval is 15 kHz.

When using extended CPs, the normal TTI may be constituted of twelve OFDM symbols (or twelve SC-FDMA symbols). In this case, each OFDM symbol (or each SC-FDMA symbol) has a time length of 66.7 μs, and an extended CP of 16.67 μs is added thereto.

Future radio communication systems of LTE Release 13 or later, 5G, and the like desire a radio interface appropriate for high frequency bands of several tens of GHz, and a radio interface that minimizes a delay, though has a reduced packet size, so as to be appropriate for communication of relatively small amounts of data such as Internet of Things (IoT), Machine Type Communication (MTC), Machine To Machine (M2M), and the like.

Figure 2:
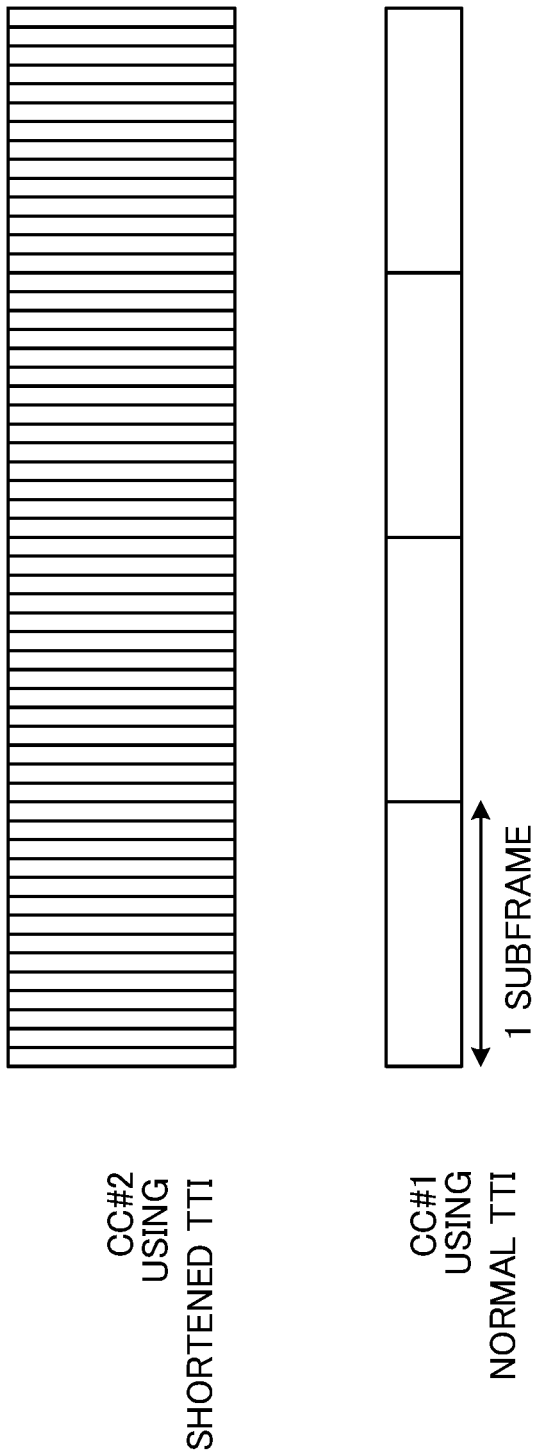
FIG. 2 is an explanatory view of a normal TTI and a short TTI.

Thus, in the future radio communication systems, communication may be performed using a short TTI that is a TTI shorter than 1 ms (see FIG. 2). FIG. 2 depicts a cell (CC #1) using the normal TTI (1 ms) and a cell (CC #2) using the short TTI. When using the short TTI, a subcarrier interval may be changed (for example, a subcarrier interval may be increased) from that when using the normal TTI.

When using the TTI (short TTI) shorter than the normal TTI, an increase in a time margin in processing (e.g., encoding and decoding) in user terminals and radio base stations allows a reduction in a processing delay. Using the short TTI also allows an increase in the number of accessible user terminals per unit of time (for example, 1 ms). The structure of the short TTI and the like will be described below.

(Examples of Structure of Short TTI)

Figure 3A:
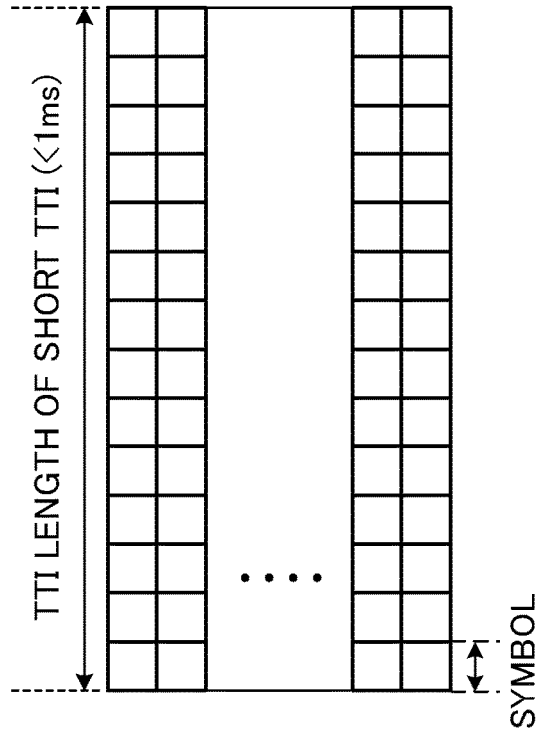
FIGS. 3A and 3B are drawings depicting examples of the structure of the short TTI.
Figure 3B:
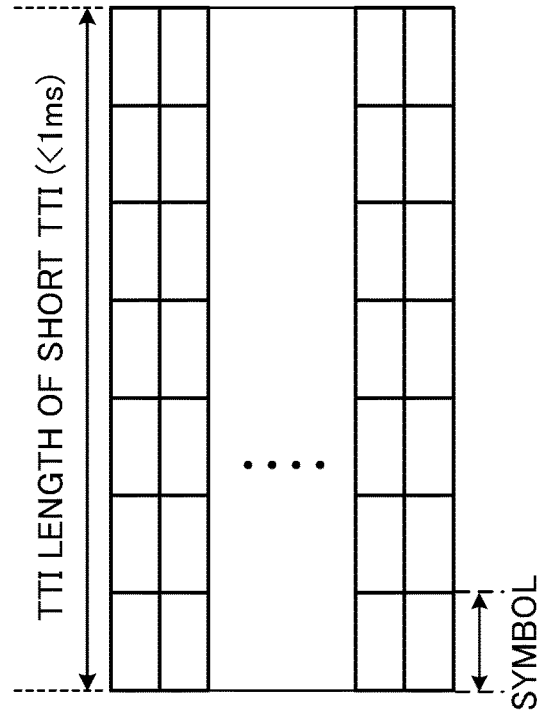

Examples of the structure of the short TTI will be described with reference to FIGS. 3A and 3B. As depicted in FIGS. 3A and 3B, the short TTI has a time length (TTI length) shorter than 1 ms. The short TTI may have a TTI length of, for example, 0.5 ms, 0.25 ms, 0.2 ms, or 0.1 ms, the integral multiple of which is 1 ms. This allows introducing the short TTI while maintaining compatibility with the normal TTI of 1 ms. The short TTI may be constituted in units of symbols (for example, 1/14 ms).

FIGS. 3A and 3B describe the case of using normal CPs as examples, but the invention is not limited thereto. The short TTI may have any length as long as it is shorter than the normal TTI, and may have any structure as to the number of symbols, the length of each symbol, and the length of each CP. OFDM symbols are used in a DL and SC-FDMA symbols are used in an UL in the following description, but the invention is not limited thereto.

FIG. 3A depicts a first example of the structure of the short TTI. In the first example, as depicted in FIG. 3A, the short TTI is constituted of fourteen OFDM symbols (or SC-FDMA symbols), the number of which is the same as that of the normal TTI. Each OFDM symbol (or each SC-FDMA symbol) has a symbol length shorter than the symbol length (=66.7 μm) of the normal TTI.

When shortening the symbol length while maintaining the number of the symbols of the normal TTI, as depicted in FIG. 3A, a physical layer signal structure of the normal TTI can be shared. When shortening the symbol length while maintaining the number of the symbols of the normal TTI, the amount of information (the number of bits) contained in the short TTI is reduced, as compared with the normal TTI, due to an increase in subcarrier intervals.

FIG. 3B depicts a second example of the structure of the short TTI. In the second example, as depicted in FIG. 3B, the short TTI is constituted of a lesser number of OFDM symbols (or SC-FDMA symbols) than the normal TTI. Each OFDM symbol (or each SC-FDMA symbol) has the same symbol length as the symbol length (=66.7 μm) of the normal TTI. For example, in FIG. 3B, the short TTI is constituted of seven OFDM symbols (or SC-FDMA symbols), which is half the number of the symbols of the normal TTI.

When reducing the number of symbols while maintaining the symbol length, as depicted in FIG. 3B, the amount of information (the number of bits) contained in the short TTI is reduced, as compared with the normal TTI. A user terminal can perform reception processing (e.g., demodulation and decoding) of information contained in the short TTI in shorter time than in the normal TTI, thus allowing a reduction in a processing delay. The signals contained in the short TTI of FIG. 3B can be multiplexed on signals of the normal TTI in the same CC (for example, orthogonal frequency division multiplexing: OFDM), thus allowing maintaining compatibility with the normal TTI.

(Examples of Configuration of Short TTI)

Examples of the configuration of the short TTI will be described. When using the short TTI, a user terminal may be configured for both the normal TTI and the short TTI so as to have compatibility with LTE Releases 8 to 12. FIGS. 4A to 4C depict examples of the configuration of the normal TTI and the short TTI. Note that, FIGS. 4A to 4C depict merely examples, and the configuration of the TTI is not limited thereto.

FIG. 4A is a drawing of a first example of the configuration of the short TTI. As depicted in FIG. 4A, the normal TTI and the short TTI may be temporally mixed in a single component carrier (CC) (a single frequency band). To be more specific, the short TTI may be configured in specific subframes (or specific radio frames) of the single CC. For example, In FIG. 4A, the short TTI is configured in five continuous subframes of the single CC, while the normal TTI is configured in the other subframes. The specific subframes may be, for example, subframes allocated for MBSFN transmission, and subframes that contain (or do not contain) specific signals such as MIB and synchronization channels. The number and positions of the subframes in which the short TTI is configured are not limited to the example of FIG. 4A.

FIG. 4B is a drawing of a second example of the configuration of the short TTI. As depicted in FIG. 4B, CCs of the normal TTI and a CC of the short TTI may be aggregated in Carrier Aggregation (CA) or Dual Connectivity (DC). To be more specific, the short TTI may be configured in a specific CC (more specifically, a DL and/or UL of the specific CC). For example, in FIG. 4B, the short TTI is configured in a downlink of a specific CC, and the normal TTI is configured in a downlink and an uplink of another CC. The number and positions of CCs in which the short TTI is configured are not limited to the example of FIG. 4B.

In CA, the short TTI may be configured in a specific CC (primary (P) cell or/and secondary (S) cell) from a single radio base station. In DC, on the other hand, the short TTI may be configured in a specific CC (P cell or/and S cell) in a master cell group (MCG) formed by a first radio base station, or a specific CC (primary secondary (PS) cell or/and S cell) in a secondary cell group (SCG) formed by a second radio base station.

FIG. 4C is a drawing of a third example of the configuration of the short TTI. As depicted in FIG. 4C, the short TTI may be configured in any of a DL and an UL. For example, in FIG. 4C, the normal TTI is configured in the UL, while the short TTI is configured in the DL in a TDD system.

The short TTI may be allocated to (configured in) a specific channel or signal in a DL or an UL. For example, the normal TTI may be allocated to a physical uplink control channel (PUCCH), while the short TTI may be allocated to a physical uplink shared channel (PUSCH).

A multi-access scheme different from OFDM (or SC-FDMA), which is a multi-access scheme for LTE Releases 8 to 12, may be allocated to the short TTI.

As described above, in the future radio communication systems, it is assumed that the short TTI that is shorter than the normal TTI is applied to an UL transmission and/or DL transmission. In the future radio communication systems, as depicted in FIG. 4B, communication (e.g., CA or DC) may be performed between a user terminal and radio base stations using a plurality of cells using different TTIs. In this case, how to control the communication between the user terminal and the radio base stations becomes a problem.

For example, a case where a user terminal communicates with radio base stations that use a first cell using a normal TTI (an existing LTE system) and a second cell using a short TTI in a high frequency band will be considered. In this case, the first cell, which has a wide coverage area, may broadcast system information and paging information (hereinafter also referred to as "broadcast information").

In this case, however, even if the cell using the short TTI is allocated to the user terminal, the operation of the user terminal based on the broadcast information is performed in reception timing of the normal TTI. Thus, the use of the short TTI may not sufficiently serve to speedup the operation of the user terminal. On the other hand, when only the cell using the short TTI transmits the broadcast information, if the cell using the short TTI does not have a sufficient coverage area, the user terminal has to frequently receive the broadcast information from different cells (e.g. small cells), while moving. This may cause increases in a load, a processing delay, and the like in the operation of the user terminal.

Thus, the inventors have come up with the idea of broadcasting certain information from each of a plurality of cells using different TTIs, when performing communication between a user terminal and radio base stations using the plurality of cells (or CCs, carriers) using the different TTIs. For example, when the user terminal performs communication using a first cell and a second cell that uses a shorter TTI than a TTI of the first cell, the operation of the user terminal is controlled based on information broadcasted from each of the first and second cells.

This makes it possible to speed up the operation of the user terminal using the broadcast information. The certain information (also referred to as broadcast information) to be broadcasted from each of the cells (e.g., the first and second cells) using the different TTIs is system information and/or paging information.

As the system information, there are a master information block (MIB) and/or system information blocks (SIBs). The MIB is transmitted on a broadcast channel (BCH). The SIBs are transmitted by RRC signaling. The paging information is transmitted on a paging channel. Note that, this embodiment is also applicable to other information as well as the above information.

This embodiment will be described below in detail. The following description takes communication that uses a cell (a first cell) using a normal TTI (an exiting LTE system) and a cell (a second cell) using a short TTI (for example, a successor to LTE or a different system from LTE) as an example, but the number of used cells and the TTI length of each cell are not limited to the description.

In the following description, a transmission unit having a time length shorter than the normal TTI (1 ms) is referred to as "short TTI", but the name is not limited thereto. The following description takes an LTE system as an example, but this embodiment is not limited thereto. This embodiment is applicable to any communication system as long as the communication system transmits broadcast information using a short TTI having a transmission time length shorter 1 ms.

(First Aspect)

A first aspect describes a case where when a user terminal communicates with radio base stations (by CA or DC) using a first cell and a second cell using different TTIs (TTI lengths), the first cell and the second cell transmit different types of broadcast information from each other to the user terminal. In this case, a part of the broadcast information to be transmitted from each of the first and second cells may be common information.

Figure 5:
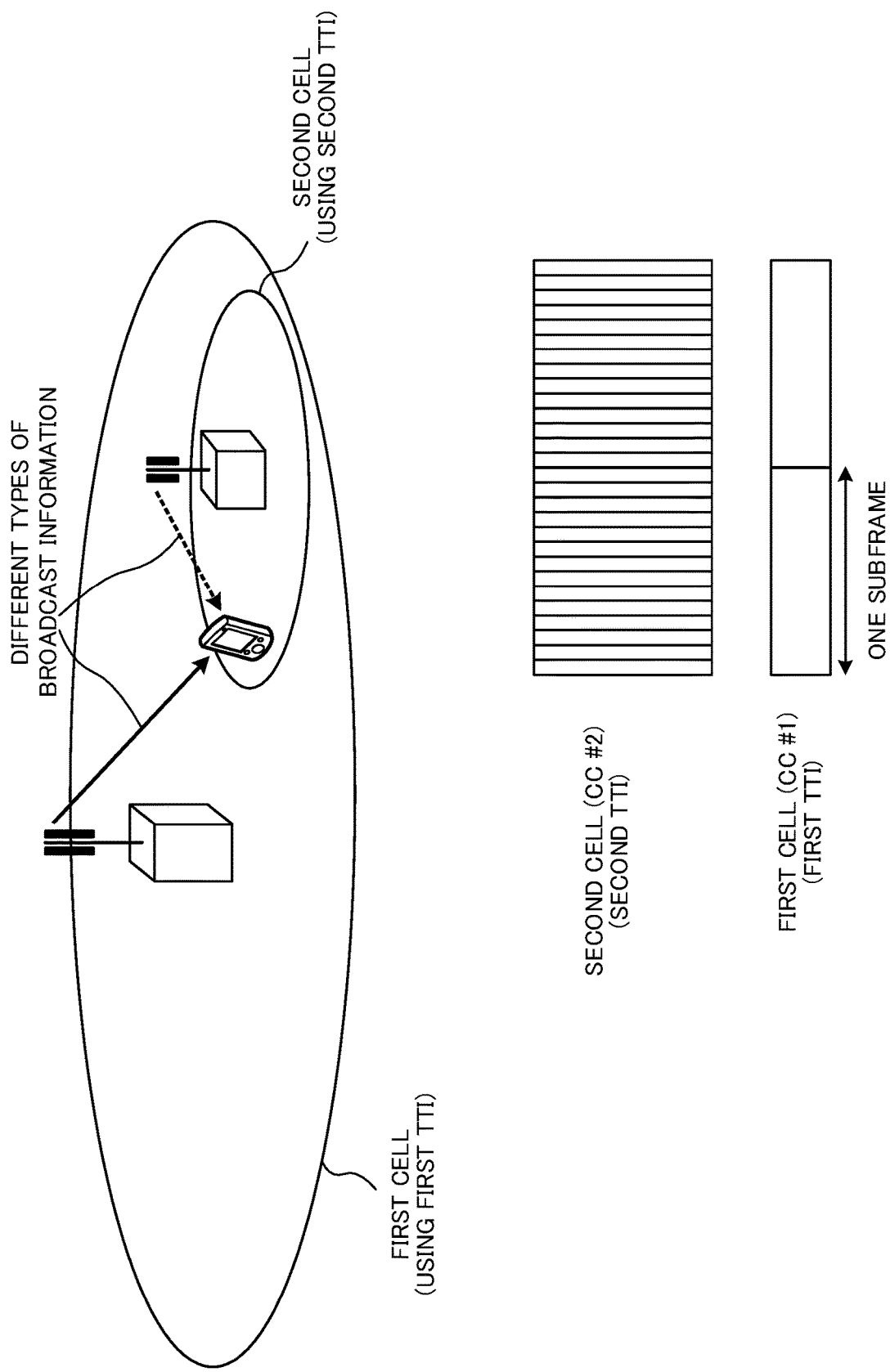
FIG. 5 is a drawing depicting an example of a transmission method of broadcast information according to a first aspect.

FIG. 5 depicts a case where a user terminal is connected to a first cell (or a first CC, a first carrier, or a first radio base station) using a first TTI and a second cell (or a second CC, a second carrier, or a second radio base station) using a second TTI. The first TTI is assumed to be a normal TTI (one subframe (1 ms) of existing LTE systems), while the second TTI is assumed to be a short TTI ($1/14$ ms). When the user terminal applies CA using the first and second cells, one of the cells (e.g., the first cell) may be set as a primary cell, and the other (e.g., the second cell) may be set as a secondary cell.

For example, radio base stations transmit broadcast information corresponding to the first cell (e.g., broadcast information for existing LTE systems) to the user terminal on the first cell, and transmit the broadcast information corresponding to the first cell and broadcast information corresponding to the second cell to the user terminal on the second cell. The broadcast information corresponding to the first cell is information (e.g., system information) to be used in communication by the first cell. The broadcast information corresponding to the second cell is information (e.g., system information) to be used in communication by the second cell.

For example, the user terminal receives the broadcast information transmitted on each cell by detecting common search space (CSS) established in each of the first and second cells. The user terminal may limit the time to detect the broadcast information transmitted on one of the cells (e.g. the second cell) to a certain period, in order to control reception operation. This eliminates the user terminal having to always detect a plurality of cells (e.g., second cell), thus allowing a reduction in a load on the operation of the user terminal.

The radio base stations may notify the user terminal of information about a time period (certain period) to detect the second cell by higher layer signaling (e.g., RRC signaling or the like). For example, when the user terminal is connected to the first cell, the radio base stations may notify the user terminal of the information about the certain period with the use of the first cell. The radio base stations may notify the user terminal of information about the TTI of the second cell, cell IDs, and/or information on used frequencies and the like on the first cell, as well as the information about the certain period. The time period (certain period) to detect the cell may be, for example, a transmission period of the SIBs, or the number of subframes to monitor a downlink control channel.

As described above, since the user terminal is notified of the broadcast information corresponding to the first cell using the relatively long TTI with the use of the second cell using the relatively short TTI, it is possible to shorten the time for the user terminal to obtain the broadcast information corresponding to the first cell.

The radio base stations can determine information broadcasted by the first cell and information broadcasted by the second cell depending on the type (application) of information to be broadcasted. For example, the radio base stations transmit urgent information (system information and paging information the user terminal should receive immediately) on the second cell using the relatively short TTI. On the other hand, the radio base stations transmit non-urgent information on the first cell using the relatively long TTI.

As the urgent information, there are earthquake and tsunami warning system (ETWS) alerts, commercial mobile alert service (CMAS) messages, and the like. The radio base stations can transmit broadcast information about mission critical systems that require high reliability and very low delay on the second cell using the relatively short TTI. Transmitting the broadcast information that the user terminal should receive as quickly as possible on the second cell using the relatively short TTI allows quick notification to the user terminal, even when communication is performed by the system (first cell) using the relatively long TTI.

When the radio base stations notify the user terminal of the system information using a plurality of system information blocks (SIBs), the radio base stations can transmit a part of the plurality of SIBs (e.g., SIB1 to SIB19) on the first cell, while transmitting the others on the second cell.

When the first cell and the second cell carry the different SIBs, the radio base stations may notify the user terminal of information about the SIBs to be transmitted on each cell (which cell carries which SIB) with the use of the SIB (e.g., SIB1).

As described above, since each of the first and second cells carries the different SIBs depending on the application of the system information, the notification of the broadcast information can be controlled with flexibility. Note that, the radio base stations may transmit a specific SIB on the second cell, while transmitting all the SIBs from the first cell.

The radio base stations can notify the user terminal in an idle (RRC-idle) state of the system information and/or the paging information using at least the second cell using the short TTI. This shortens the time required for the user terminal to return from the idle state to an RRC connected state. As a matter of course, the user terminal in the idle (RRC-idle) state may be notified of the system information and/or the paging information on the first cell and the second cell.

(Second Aspect)

A second aspect describes a case wherein a user terminal communicates with radio base stations (by CA or DC) using a first cell and a second cell having different TTIs (TTI lengths), the first cell and the second cell transmit the same broadcast information to the user terminal. In this case, the broadcast information to be transmitted from each of the first and second cells may be partly different.

Figure 6:
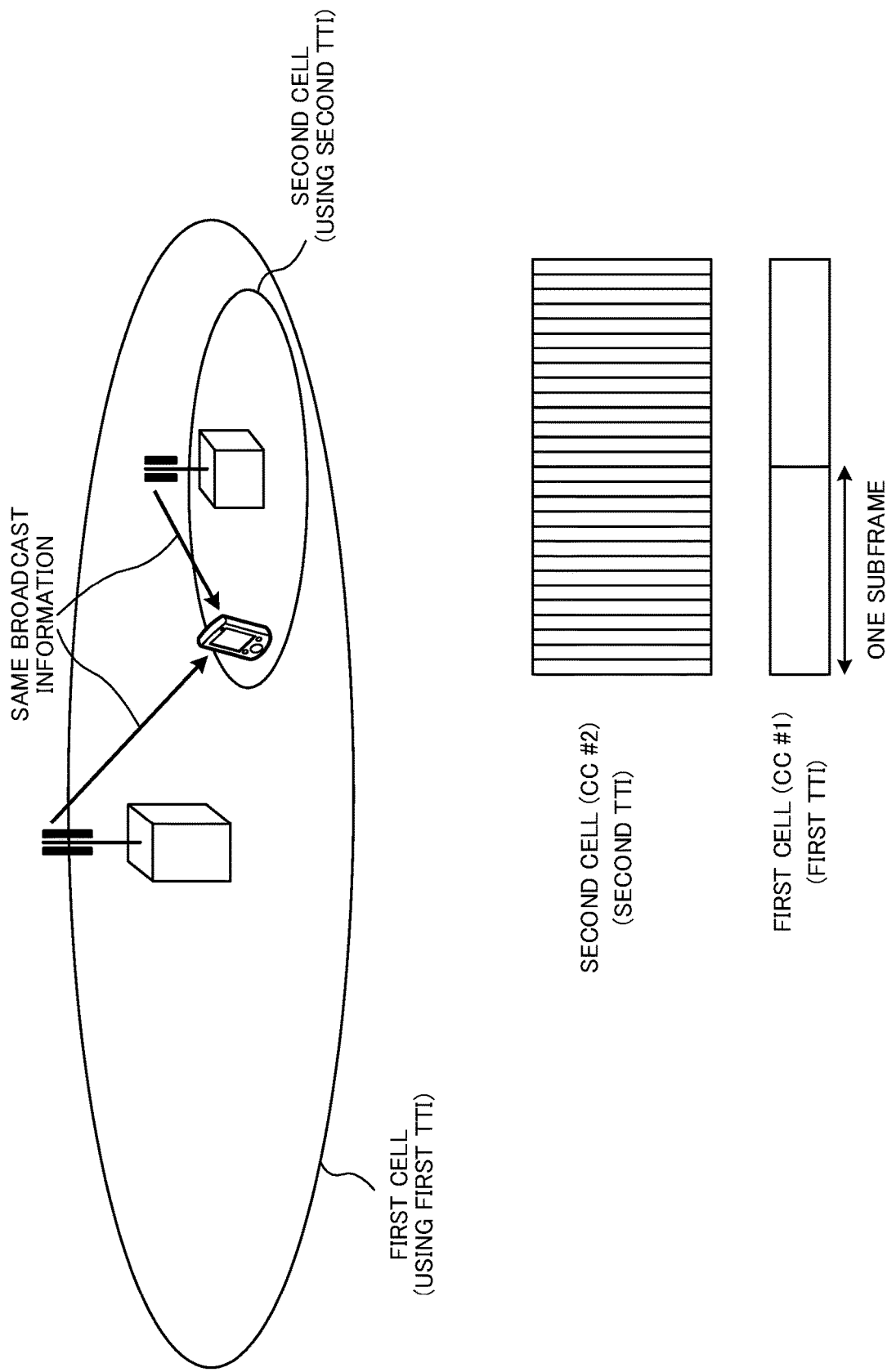
FIG. 6 is a drawing depicting an example of a transmission method of broadcast information according to a second aspect.

FIG. 6 depicts a case where a user terminal is connected to a first cell (or a first CC, a first carrier, or a first radio base station) using a first TTI and a second cell (or a second CC, a second carrier, or a second radio base station) using a second TTI. The first TTI is assumed to be a normal TTI (1 ms), while the second TTI is assumed to be a short TTI (1/14 ms). When the user terminal applies CA using the first and second cells, one of the cells (e.g., the first cell) may be set as a primary cell, and the other (e.g., the second cell) may be set as a secondary cell.

For example, radio base stations transmit the same broadcast information from each of the first and second cells to the user terminal. The broadcast information may be transmitted from the first and second cells in the same timing or different timings. The user terminal receives (for example, concurrently receives) the same information on the first cell using the relatively long TTI and the second cell using the relatively short TTI.

For example, the user terminal receives the broadcast information transmitted on each cell by detecting common search space (CSS) established in each of the first and second cells. The user terminal may limit the time to detect the broadcast information transmitted on one of the cells (e.g., the second cell) to a certain period, in order to control reception operation. This eliminates the need for the user terminal to always detect a plurality of cells (e.g., second cell), thus allowing a reduction in a load on the operation of the user terminal.

The radio base stations may notify the user terminal of information about a time period (certain period) to detect the second cell by higher layer signaling (e.g. RRC signaling or the like). For example, when the user terminal is connected to the first cell, the radio base stations may notify the user terminal of the information about the certain period with the use of the first cell. The radio base stations may notify the user terminal of information about the TTI of the second cell, cell IDs, and/or information on used frequencies and the like on the first cell, as well as the information about the certain period.

As described above, since the user terminal is notified of the same broadcast information on the first and second cells having the different TTI lengths, the user terminal can efficiently receive the broadcast information. In particular, transmitting the broadcast information on the second cell using the relatively long TTI allows supporting coverage on the user terminal. Transmitting the broadcast information on the first cell using the relatively short TTI allows a reduction in delay in transmission to the user terminal.

In the above two aspects, SIBs related to the cells using the different TTIs may be transmitted as different system information messages, or concurrently transmitted as a single system information message.

(Example of Notification of Short TTI)

When a cell using a short TTI is established on a user terminal, as described above, the user terminal can set (and/or detect) the short TTI based on an implicit or explicit notification from a radio base station. Examples of the notification of the short TTI applicable to this embodiment will be described between (1) the case of an implicit notification and the case of at least one of explicit notifications including (2) broadcast information or radio resource control (RRC) signaling, (3) medium access control (MAC) signaling, and (4) physical (PHY) signaling.

(1) In the case of an implicit notification, the user terminal may set the short TTI (for example, determine that communication cells, channels, signals, and the like use the short TTI) based on a frequency band (e.g., a band for 5G, an unlicensed band, or the like), a system bandwidth (e.g., 100 MHz or the like), the presence or absence of application of Listen Before Talk (LBT) in License Assisted Access (LAA), the type of data to be transmitted (e.g., control data, sound data, or the like), a logic channel, transport blocks, a radio link control (RLC) mode, a cell-radio network temporary identifier (C-RNTI), and the like.

(2) In the case of broadcast information or RRC signaling, the short TTI may be set based on the broadcast information or setting information transmitted from the radio base station (e.g., the first cell) to the user terminal by the RRC signaling. The setting information includes, for example, information about a CC and/or a subframe using the short TTI, information about a channel and/or a signal using the short TTI, information about the TTI length of the short TTI, and the like. The user terminal semi-statically set the short TTI based on the setting information from the radio base station. The switching between the short TTI and the normal TTI may be performed by an RRC reconfiguration procedure, or inter-cell handover (HO) in a P cell and a CC (S cell) removal or addition procedure in a S cell.

(3) In the case of MAC signaling, the short TTI that is set based on the setting information transmitted by the RRC signaling may be activated or deactivated by the MAC signaling. To be more specific, the user terminal activates or deactivates the short TTI based on a MAC control element from the radio base station. When switching a mode between the short TTI and the normal TTI in the S cell, the S cell may be temporarily deactivated, or a timing advance (TA) timer may be assumed to be completed. This allows establishing a communication stop period for the mode switching.

(4) In the case of PHY signaling, the short TTI set based on the setting information transmitted by the RRC signaling may be scheduled by the PHY signaling. To be more specific, the user terminal detects the short TTI based on a physical downlink control channel (PDCCH) or an enhanced physical downlink control channel (EPDCCH) (hereinafter referred to as PDCCH/EPDCCH).

For example, (4-1) the user terminal may recognize a TTI for receiving the PDCCH/EPDCCH, which is to be transmitted and received in a short TTI, as the short TTI. (4-2) The user terminal may recognize a TTI (scheduled TTI) for transmitting or receiving a PDSCH or a PUSCH scheduled by (downlink control information (DCI) transmitted on) the PDCCH/EPDCCH, as the short TTI. (4-3) The user terminal may recognize a TTI for transmitting or receiving a hybrid automatic repeat request acknowledgement (HARQ-ACK) on a PDSCH/PUSCH scheduled by (DCI transmitted on) the PDCCH/EPDCCH, as the short TTI.

The user terminal may detect the short TTI based on the state (e.g. idle state or connected state) of the user terminal. For example, when the user terminal is in the idle state, all TTIs may be detected as the normal TTIs. In the connected state, the user terminal may set (and/or detect) the short TTI based on at least one of the above notification examples (1) to (4).

(Radio Communication System)

The structure of a radio communication system according to an embodiment of the present invention will be described below. The radio communication system applies a radio communication method according to each of the above aspects. The radio communication methods according to the above aspects may be applied separately or in combination.

Figure 7:
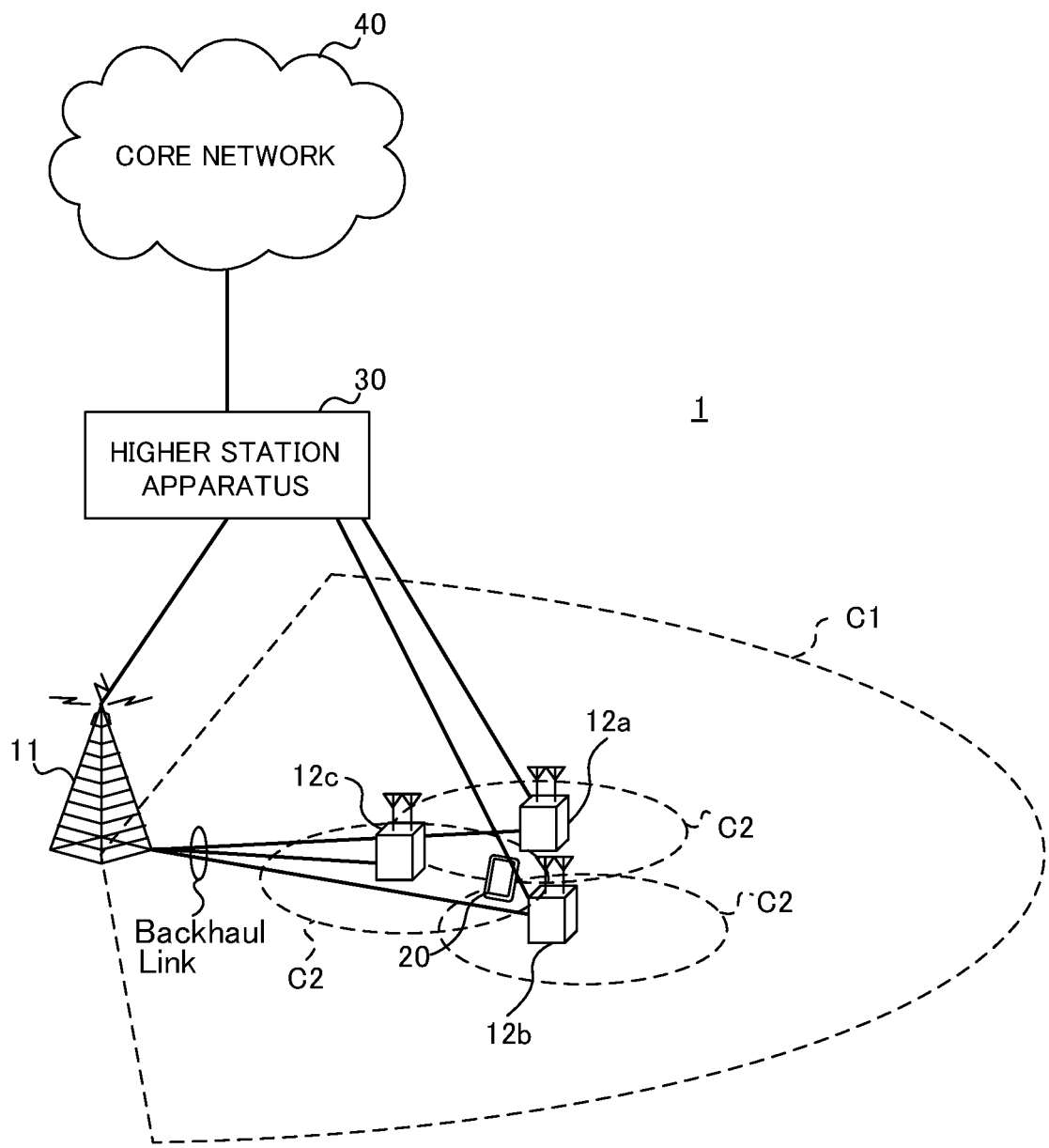
FIG. 7 is a schematic configuration diagram of a radio communication system according to an embodiment.

FIG. 7 is a drawing depicting an example of the schematic structure of the radio communication system according to an embodiment of the present invention. A radio communication system 1 applies Carrier Aggregation (CA) and/or Dual Connectivity (DC) to aggregate multiple basic frequency blocks (component carriers) in units of a system bandwidth (e.g., 20 MHz) of LTE systems. The radio communication system 1 may be also referred to as SUPER 3G, LTE-Advanced (LTE-A), IMT-Advanced, 4G, 5G, Future Radio Access (FRA), and the like.

As depicted in FIG. 7, the radio communication system 1 includes a radio base station 11 for forming a macro cell C1, and radio base stations 12a to 12c that are disposed in the macro cell C1 and form small cells C2 smaller than the macro cell C1. A user terminal 20 is disposed in the macro cell C1 and the small cells C2.

The user terminal 20 is connectable to both of the radio base stations 11 and 12. It is assumed that the user terminal 20 concurrently uses the macro cell C1 and the small cells C2 using different frequencies by CA or DC. The user terminal 20 may apply CA or DC using a plurality of cells (CCs) (e.g., six or more CCs). A short TTI can be applied to UL transmission and/or DL transmission between user terminal 20 and the radio base station 11 or between the user terminal 20 and the radio base station 12. The user terminal can communicate with the radio base stations by using at least two CCs having different TTI lengths.

The user terminal 20 can communicate with the radio base station 11 using a narrow band carrier (referred to as an existing carrier, a legacy carrier, and the like) in a relatively low frequency band (for example, 2 GHz). On the other hand, the user terminal 20 may communicate with the radio base station 12 using a wide band carrier in a relatively high frequency band (for example, 3.5 GHz, 5 GHz, or the like), or using the same carrier as for the radio base station 11. The structure of the frequency band used in each radio base station is not limited thereto.

The radio base stations 11 and 12 (or the two radio base stations 12) are connected with a wire (e.g. a Common Public Radio Interface (CPRI)-compliant optical fiber, an X2 interface, or the like), or connected wirelessly.

Each of the radio base stations 11 and 12 is connected to a host apparatus 30, and connected to a core network 40 through the host apparatus 30. The host apparatus 30 includes, for example, an access gateway, a radio network controller (RNC), a mobility management entity (MME), and the like, but is not limited thereto. Each radio base station 12 may be connected to the host apparatus 30 through the radio base station 11.

The radio base station 11 is a radio base station having a relatively large coverage, and may be also referred to as a macro base station, an aggregation node, an eNodeB (eNB), a transmission and reception point, and the like. The radio base station 12 is a radio base station having a local coverage, and may be also referred to as a small base station, a micro base station, a pico base station, a femto base station, a Home eNodeB (HeNB), a remote radio head (RRH), a transmission and reception point, and the like. The radio base stations 11 and 12 are collectively called radio base stations 10 below, when not distinguishing therebetween.

Each user terminal 20 is a terminal compliant to any of various communication schemes such as LTE and LTE-A, and may include a stationary communication terminal, as well as a mobile communication terminal.

In the radio communication system 1, Orthogonal Frequency Division Multiple Access (OFDMA) is applied in a downlink and Single Carrier Frequency Division Multiple Access (SC-FDMA) is applied in an uplink, as radio access schemes. OFDMA is a multicarrier transmission scheme in which a frequency band is divided into narrow frequency bands (subcarriers) and communication is performed by mapping data to each subcarrier. SC-FDMA is a single carrier transmission scheme in which a system bandwidth is divided on a terminal-by-terminal basis into bands each of which is constituted of one or two or more continuous resource blocks, and terminals use the different bands from each other in order to reduce interference between the terminals. The uplink and downlink radio access schemes are not limited to this combination, and OFDMA may be used in the uplink.

The radio communication system 1 uses a physical downlink shared channel (PDSCH) shared among user terminals 20, a physical broadcast channel (PBCH), a downlink L1/L2 control channel, and the like as downlink channels. The PDSCH carries user data, higher layer control information, system information blocks (SIBs), and the like. The PBCH carries a master information block (MIB).

The downlink L1/L2 control channel includes a physical downlink control channel (PDCCH), an enhanced physical downlink control channel (EPDCCH), a physical control format indicator channel (PCFICH), a physical hybrid-ARQ indicator channel (PHICH), and the like. The PDCCH carries downlink control information (DCI) including scheduling information on the PDSCH and the PUSCH, and the like. The PCFICH carries the number of OFDM symbols used on the PDCCH. The PHICH carries delivery confirmation information (ACK/NACK) on a hybrid automatic repeat request (HARQ) for the PUSCH. The EPDCCH is frequency division multiplexed with the physical downlink shared channel (PDSCH), and used for transmitting the DCI, just as with the PDCCH.

The radio communication system 1 uses a physical uplink shared channel (PUSCH) shared among user terminals 20, a physical uplink control channel (PUCCH), a physical random access channel (PRACH), and the like as uplink channels. The PUSCH carries user data, higher layer control information, and the like. The PUSCH or the PUCCH carries uplink control information (UCI) including at least one of delivery confirmation information (ACK/NACK), channel quality indicator (CQI), and the like. The PRACH carries a random access preamble to establish connection with cells.

(Radio Base Station)

Figure 8:
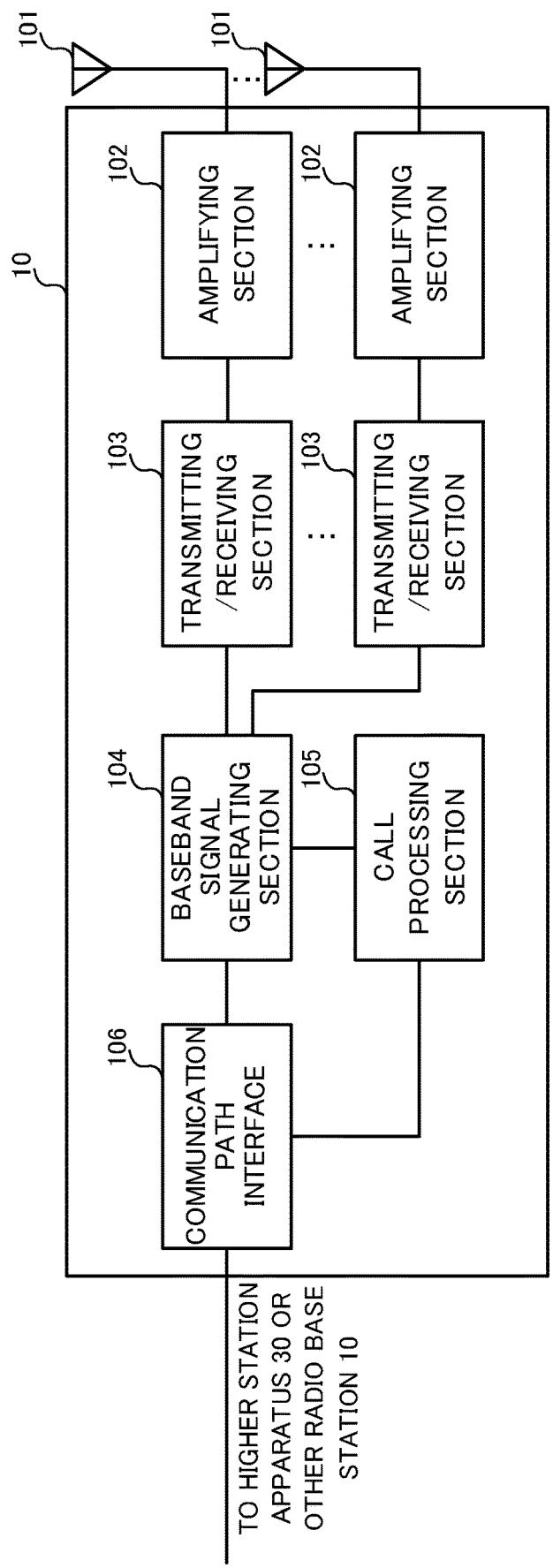
FIG. 8 is a drawing depicting an example of the entire configuration of a radio base station according to the embodiment.

FIG. 8 is a drawing depicting an example of the entire configuration of a radio base station according to an embodiment of the present invention. The radio base station 10 includes transmission and reception antennas 101, amplifying sections 102, transmission and reception sections 103, a baseband signal processing section 104, a call processing section 105, and a transmission channel interface 106. The transmission and reception section 103 is constituted of a transmission section and a reception section.

User data to be transmitted from the radio base station 10 to the user terminal 20 on a downlink is inputted from the host apparatus 30 to the baseband signal processing section 104 through the transmission channel interface 106.

The baseband signal processing section 104 applies transmission processing, which includes radio link control (RLC) layer transmission processing such as packet data convergence protocol (PDCP) layer processing, the division and coupling of the user data, and RLC retransmission control, medium access control (MAC) retransmission control (e.g. hybrid automatic repeat request (HARQ) transmission processing), scheduling, a choice of a transmission format, channel encoding, inverse fast Fourier transform (IFFT) processing, precoding, and the like, to the user data, and transfer the processed user data to the transmitting and receiving sections 103. The baseband signal processing section 104 also applies transmission processing including channel encoding, IFFT processing, and the like to a downlink control signal, and transfers the processed downlink control signal to the transmitting and receiving sections 103.

The transmitting and receiving section 103 converts the baseband signal, which is pre-coded and outputted from the baseband signal processing section 104 on an antenna-by-antenna basis, into a signal in a radio frequency band, and transmits the converted signal. The radio frequency signal that is frequency-converted by the transmitting and receiving 103 is amplified by the amplifying section 102, and transmitted from the transmission and reception antenna 101.

The transmitting and receiving section (transmitting sections) 103 broadcast certain information in a plurality of cells using different TTIs. The transmitting and receiving section (transmitting sections) 103 transmit system information including master information block and/or system information blocks, paging information, and the like as the certain information. The transmitting and receiving section 103 is constituted of a combination of a transmitter and a receiver, a transmission and reception circuit, or a transmission and reception device that is described based on common knowledge in the technical art of the present invention. The transmitting and receiving section 103 may be constituted of an integral transceiver section, or a transmission section and a reception section.

As for an uplink signal, on the other hand, a radio frequency signal received by the transmission and reception antenna 101 is amplified by the amplifying section 102. The transmitting and receiving section 103 receives the uplink signal amplified by the amplifying section 102. The transmitting and receiving section 103 frequency-converts the reception signal into a baseband signal, and outputs the baseband signal to the baseband signal processing section 104.

The baseband signal processing section 104 applies fast Fourier transform (FFT) processing, inverse discrete Fourier transform (IDFT) processing, error correction decoding, reception processing for MAC retransmission control, and reception processing of a PLC layer and a PDCP layer to user data included in the inputted uplink signal. The processed uplink signal is transferred to the host apparatus 30 through the transmission channel interface 106. The call processing section 105 performs call processing such as settings and release of communication channels, state management of the radio base station 10, and management of radio resources.

The transmission channel interface 106 transmits and receives signals to and from the host apparatus 30 through a certain interface. The transmission channel interface 106 may transmit and receive (backhaul signaling) signals to and from another radio base station through an interface (e.g., a common public radio interface (CPRI)-compliant optical fiber or an X2 interface) between the radio base stations.

Figure 9:
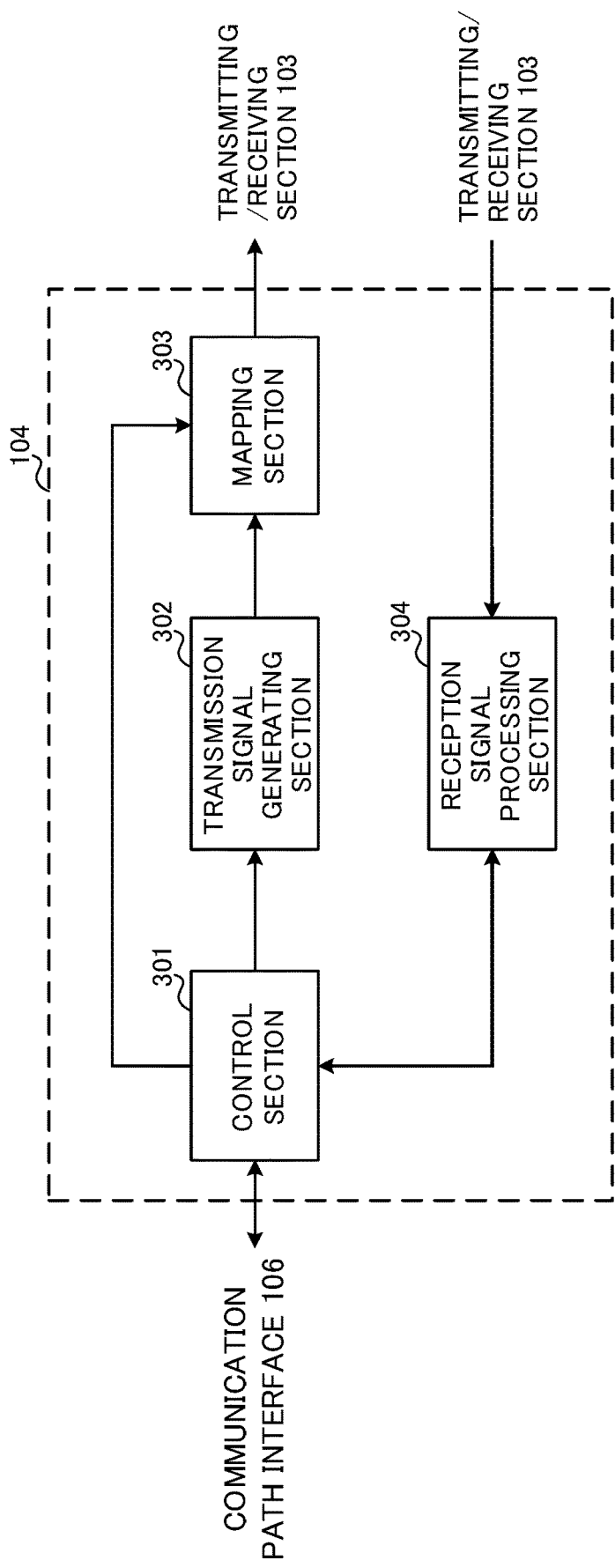
FIG. 9 is a drawing depicting an example of the functional configuration of the radio base station according to the embodiment.

FIG. 9 is a drawing depicting an example of the functional configuration of the radio base station according to this embodiment. FIG. 9 mainly depicts functional blocks that are features of the embodiment, and the radio base station 10 has other functional blocks required for radio communication. As depicted in FIG. 9, the baseband signal processing section 104 includes a control section (scheduler) 301, a transmitting and receiving section (generation section) 302, a mapping section 303, and a reception signal processing section 304.

The control section (scheduler) 301 controls communication (transmission and/or reception of signals, and the like) using a plurality of cells that include at least a first cell and a second cell using a shorter TTI than a TTI of the first cell. To be more specific, the control section (scheduler) 301 controls the scheduling (e.g., resource allocation) of downlink data signals to be transmitted on the PDSCH and downlink control signals to be transmitted on the PDCCH or the EPDCCH. The control section (scheduler) 301 also controls the scheduling of system information, synchronization signals, paging information, cell-specific reference signals (CRSs), channel state information reference signals (CSI-RSs), and the like. The control section (scheduler) 301 also controls the scheduling of uplink reference signals, uplink data signals to be transmitted on the PUSCH, uplink control signals to be transmitted on the PUCCH and/or the PUSCH, and the like. The control section 301 is constituted of a controller, a control circuit, or a control device that is described based on common knowledge in the technical art of the present invention.

The transmission signal generation section 302 generates DL signals (including downlink data signals and downlink control signals) based on commands from the control section 301, and outputs the DL signals to the mapping section 303. To be more specific, the transmission signal generation section 302 generates downlink data signals (PDSCH) including user data and outputs the downlink data signal to the mapping section 303. The transmission signal generation section 302 generates downlink control signals (PDCCH/EPDCCH) including DCI (a UL grant), and outputs the downlink control signals to the mapping section 303. The transmission signal generation section 302 generates downlink reference signals such as CRS and CSI-RS, and outputs the downlink reference signals to the mapping section 303.

The transmission signal generation section 302 generates broadcast information, and outputs the broadcast information to the mapping section 303. When the types of broadcast information to be transmitted from each cell are controlled in accordance with the types of the broadcast information, the transmission signal generation section 302 generates certain broadcast information based on a command from the control section 301. The transmission signal generation section 302 is constituted of a signal generator, a signal generation circuit, or a signal generation device that is described based on common knowledge in the technical art of the present invention.

The mapping section 303 maps the DL signals generated by the transmission signal generation section 302 to certain radio resources based on commands from the control section 301, and outputs the mapped signals to the transmission and reception section 103. The mapping section 303 is constituted of a mapper, a mapping circuit, or a mapping device that is described based on common knowledge in the technical art of the present invention.

The reception signal processing section 304 applies reception processing (for example, demapping, demodulation, decoding, and the like) to UL signals (HARQ-ACK, PUSCH, and the like) transmitted from the user terminal 20. Processing results are outputted to the control section 301.

The reception signal processing section 304 is constituted of one of a signal processor, a signal processing circuit, and a signal processing device and one of a measurement instrument, a measurement circuit, and a measurement device that are described based on common knowledge in the technical art of the present invention.

(User Terminal)

Figure 10:
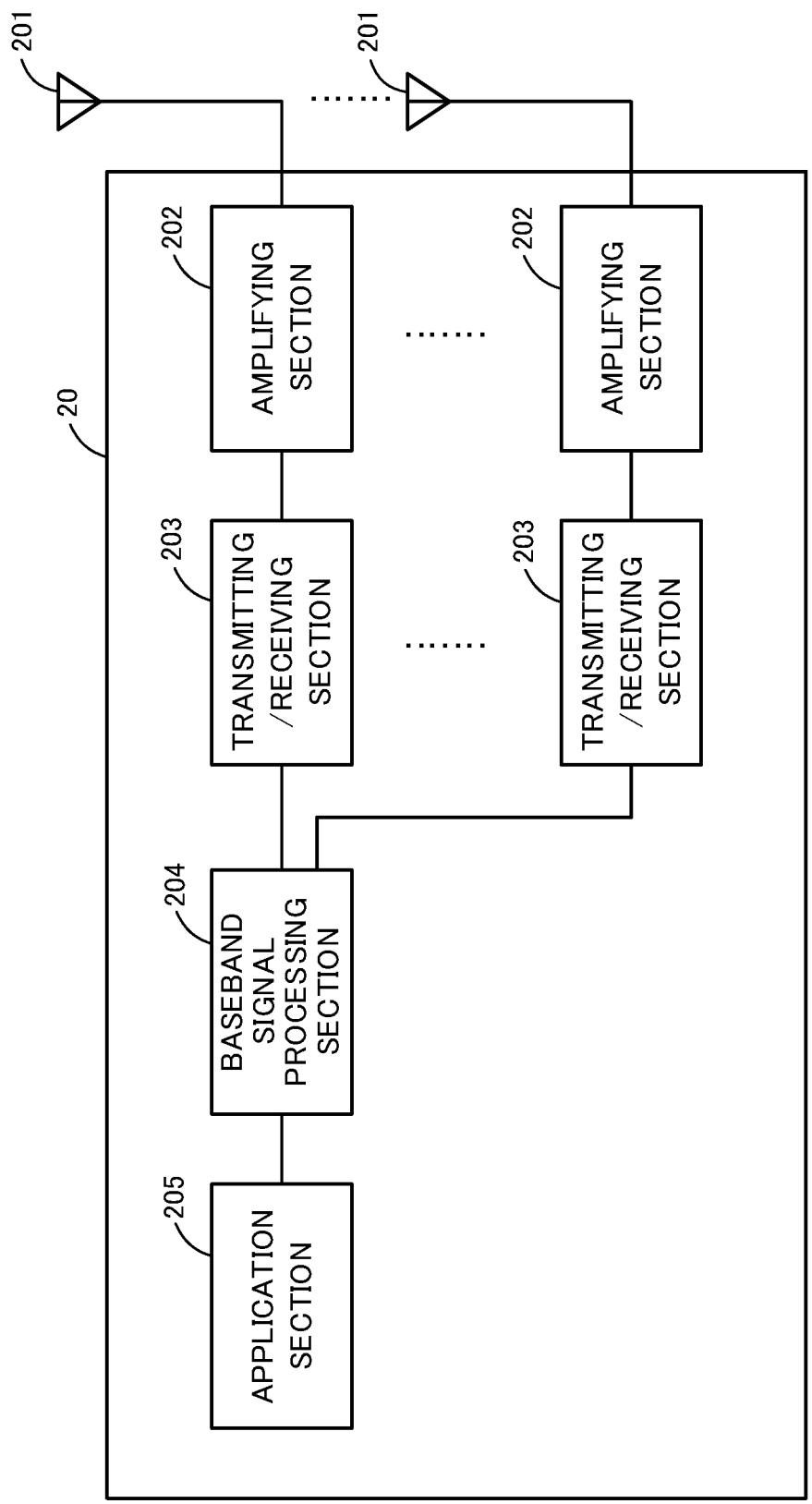
FIG. 10 is a drawing depicting an example of the entire configuration of a user terminal according to the embodiment.

FIG. 10 is a drawing depicting an example of the entire configuration of a user terminal according to an embodiment of the present invention. The user terminal 20 includes a plurality of transmission and reception antennas 201, amplifying sections 202, and transmitting and receiving sections 203 for MIMO communication, a baseband signal processing section 204, and an application section 205. The transmitting and receiving section 203 may be constituted of a transmitting and receiving section.

Radio frequency signals received by the transmission and reception antennas 201 are amplified by the amplifying sections 202. Each transmitting and receiving section 203 receives the downlink signal amplified by the amplifying section 202. The transmitting and receiving section 203 frequency-converts the reception signal into a baseband signal, and outputs the baseband signal to the baseband signal processing section 204.

The transmitting and receiving sections (receiving sections) 203 receive information broadcasted from a plurality of cells using different TTIs. For example, the transmitting and receiving sections (receiving sections) 203 receive information broadcasted from a first cell and a second cell using a shorter TTI than a TTI of the first cell, respectively. The transmitting and receiving sections (receiving sections) 203 receive a part of a plurality of system information blocks (SIBs) from the first cell, and receives the others from the second cell.

The transmitting and receiving sections (receiving sections) 203 receive broadcast information corresponding to the first cell from the first cell, and receive broadcast information corresponding to the first cell and the second cell from the second cell. The transmitting and receiving sections (receiving sections) 203 receive the broadcast information by detecting common search space established in each of the first and second cells. When the user terminal is in an idle state, the transmitting and receiving sections 203 receive at least the information broadcasted from the second cell. The transmitting and receiving section 203 is constituted of a combination of a transmitter and a receiver, a transmission and reception circuit, or a transmission and reception device that is described based on common knowledge in the technical art of the present invention.

The baseband signal processing section 204 applies FFT processing, error correction decoding, reception processing for retransmission control, and the like to inputted baseband signals. The processed downlink user data is transferred to the application section 205. The application section 205 performs processing related to higher layers than a physical layer and a MAC layer. The broadcast information of the downlink data is also transferred to the application section 205.

On the other hand, uplink user data is inputted from the application section 205 to the baseband signal processing section 204. The baseband signal processing section 204 applies transmission processing for retransmission control (e.g. HARQ transmission processing), channel coding, precoding, discrete Fourier transform (DFT) processing, IFFT processing, and the like to the user data, and transfers the processed user data to each transmitting and receiving section 203. The transmitting and receiving section 203 converts the baseband signal outputted from the baseband signal processing section 204 into a signal in a radio frequency band, and transmits the converted signal. The radio frequency signal that is frequency-converted by the transmitting and receiving section 203 is amplified by the amplifying section 202, and transmitted from the transmission and reception antenna 201.

Figure 11:
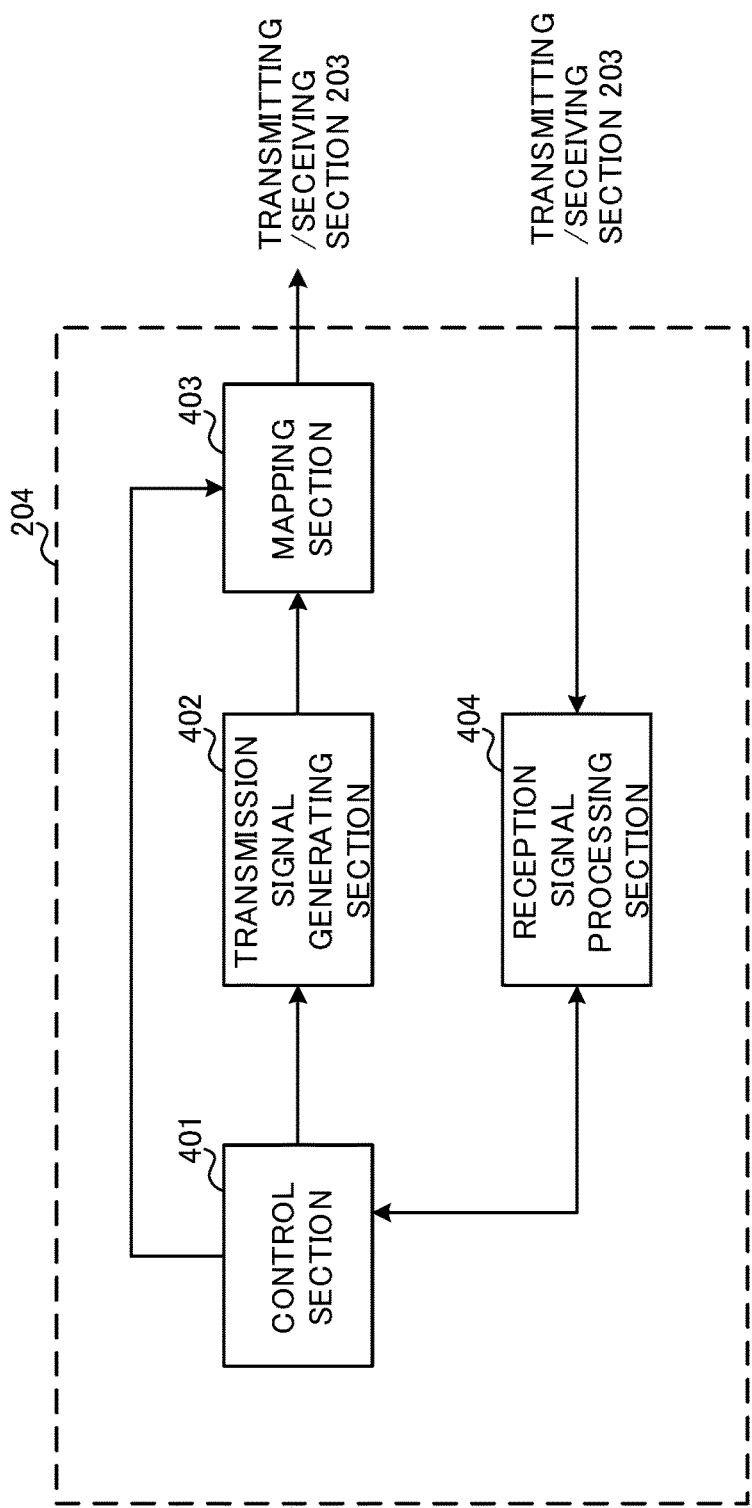
FIG. 11 is a drawing depicting an example of the functional configuration of the user terminal according to the embodiment.

FIG. 11 is a drawing depicting an example of the functional configuration of the user terminal according to this embodiment. FIG. 11 mainly depicts functional blocks that are features of the embodiment, and the user terminal 20 has other functional blocks required for radio communication. As depicted in FIG. 11, the baseband signal processing section 204 of the user terminal 20 includes a control section

401, a transmission signal generation section 402, a mapping section 403, and a reception signal processing section 404.

The control section 401 controls communication (transmission and/or reception of signals, and the like) using a plurality of cells that include at least a first cell and a second cell using a shorter TTI than a TTI of the first cell. To be more specific, the control section 401 obtains downlink control signals (signals transmitted on the PDCCH/EPDCCH) and downlink data signals (signals transmitted on the PDSCH) transmitted from the radio base stations 10 through the reception signal processing section 404. The control section 401 controls generation of uplink control signals (e.g. a delivery confirmation signal (HARQ-ACK) and the like) and uplink data signals based on the downlink control signals, a determination result of necessity for retransmission control for the downlink data signals, and the like. To be more specific, the control section 401 controls the transmission signal generation section 402, the mapping section 403, and the reception signal processing section 404.

When broadcast information is transmitted from each of the first cell and the second cell using the shorter TTI than a TTI of the first cell, the control section 401 limits the time to receive the broadcast information transmitted from the second cell to a certain period that is shorter than the time to detect the broadcast information transmitted from the first cell. The control section 401 is constituted of a controller, a control circuit, or a control device that is described based on common knowledge in the technical art of the present invention.

The transmission signal generation section 402 generates UL signals based on commands from the control section 401, and outputs the generated signals to the mapping section 403. For example, the transmission signal generation section 402 generates uplink control signals such as a delivery confirmation signal (HARQ-ACK) and channel state information (CSI), based on commands from the control section 401.

The transmission signal generation section 402 also generates uplink data signals based on commands from the control section 401. For example, when the downlink control signal issued from the radio base station 10 includes a UL grant, the control section 401 commands the transmission signal generation section 402 to generate uplink data signals. The transmission signal generation section 402 is constituted of a signal generator, a signal generation circuit, or a signal generation device that is described based on common knowledge in the technical art of the present invention.

The mapping section 403 maps the uplink signals generated by the transmission signal generation section 402 to radio resources based on commands from the control section 401, and outputs the mapped signals to the transmitting and receiving section 203. The mapping section 403 is constituted of a mapper, a mapping circuit, or a mapping device that is described based on common knowledge in the technical art of the present invention.

The reception signal processing section 404 applies reception processing (for example, demapping, demodulation, decoding, and the like) to the DL signals (for example, the downlink control signals transmitted from the radio base stations, the downlink control signals transmitted on the PDSCH, and the like). The reception signal processing section 404 outputs the information received from the radio base stations 10 to the control section 401. The reception signal processing section 404 outputs, for example, broadcast information, system information, RRC signaling, DCI, and the like to the control section 401.

The reception signal processing section 404 is constituted of one of a signal processor, a signal processing circuit, and a signal processing device and one of a measurement instrument, a measurement circuit, and a measurement device that are described based on common knowledge in the technical art of the present invention. The reception signal processing section 404 constitutes a reception section according to the present invention.

The block diagrams used in the above embodiments depict functional blocks. The functional blocks (elements) are realized by an arbitrary combination of hardware and software. A method for realizing each functional block is not specifically limited. In other words, each functional block may be realized by physically integrated one device, or physically separated two or more devices connected with or without wires.

For example, a part or all of each function of the radio base station 10 and the user terminal 20 may be realized by hardware such as an application specific integrated circuit (ASIC), a programmable logic device (PLD), and a field programmable gate array (FPGA). Each of the radio base station 10 and the user terminal 20 may be realized by a computer device including a central processing section (CPU), a communication interface for network connection, a memory, a computer-readable recording medium for storing programs therein. In other words, the radio base station, the user terminal, and the like according to an embodiment of the present invention may function as computers that execute a radio communication method according to the present invention.

The processor, the memory, and the like are connected through a bus for communicating information. The computer-readable recording medium is a recording medium such as, for example, a flexible disk, a magneto-optical disk, a read only memory (ROM), an erasable programmable ROM (EPROM), a compact disc-ROM (CD-ROM), a random access memory (RAM), and a hard disk. The programs may be transmitted from a network through electric communication lines. Each of the radio base station 10 and the user terminal 20 may include an input device such as an input key, and an output device such as a display.

The functional configurations of the radio base station 10 and the user terminal 20 may be realized by the above hardware, software modules executed by the processor, or a combination of the both of the hardware and the software modules. The processor controls the entire user terminal by executing an operating system. The processor loads the programs, the software modules, and data from the recording medium, and executes various types of processing in accordance with the programs, the software modules, and the data.

The programs are not specifically limited as long as the programs make the computers to execute the operations described in the above embodiments. For example, the control section 401 of the user terminal 20 may be realized by a control program executed by the processor, and other functional blocks may be realized in the same manner.

The software, commands, and the like may be transmitted and received through a transmission medium. For example, when the software is transmitted from a website, a server, or another remote source using wired communication technology such as a coaxial cables, an optical fiber cable, a twisted-pair cable, and a digital subscriber line (DSL) and/or wireless communication technology such as infrared rays, radio, and microwaves, the wired and/or wireless communication technology is included in the definition of the transmission medium.

The terms described in this application and/or the terms required for understanding this application may be replaced with other terms that refer to the same or similar meanings. For example, the term "channel" and/or "symbol" may be replaced with the term "signal (signaling)". The term "signal" may be replaced with the term "message". The term "component carrier (CC)" may be replaced with the term "carrier frequency", "cell", or the like.

The information, parameters, and the like described in this application may be represented in absolute values, relative values with respect to a certain value, or other information corresponding thereto. For example, the radio resources may be indicated by indexes.

The information, signals, and the like described in this application may be represented by using any of various different techniques. For example, the data, instructions, commands, information, signals, bits, symbols, chips, and the like mentioned and obtained in the whole of the above description may be represented by voltages, currents, electromagnetic waves, magnetic fields or magnetic particles, optical fields or photons, or arbitrary combinations thereof.

The aspects or embodiments described in this application may be used alone, in combination, or by switching in accordance with execution. Notification about certain information (for example, notification about being X) is not limited to be explicit, and may be implicit (for example, without the notification about the information).

Notification about information is not limited to the aspects or embodiments described in this application, but may be performed in another way. For example, the notification about information may be performed by physical layer signaling (e.g., downlink control information (DCI) and uplink control information (UCI)), higher layer signaling (e.g., radio resource control (RRC) signaling, medium access control (MAC) signaling, broadcast information (master information block (MIB) and system information blocks (SIBs)), another signal, or a combination thereof. The RRC signaling may be referred to as an RRC message, and may be, for example, an RRC Connection Setup message, an RRC Connection Reconfiguration message, or the like.

Each aspect or embodiment described in this application may be applied to systems using Long Term Evolution (LTE), LTE-Advanced (LTE-A), SUPER 3G, IMT-Advanced, 4G, 5G, Future Radio Access (FRA), CDMA2000, Ultra Mobile Broadband (UMB), IEEE 802.11 (Wi-Fi), IEEE 802.16 (WiMAX), IEEE 802.20, Ultra-WideBand (UWB), Bluetooth (trademark), and other appropriate systems, and/or next generation systems extended based thereon.

The processing procedure, sequence, flowchart, and the like of each aspect or embodiment described in this application may be permuted as long as there is no compatibility. For example, as to the method described in this application, various steps are proposed in an exemplary order, and are not limited to the specific proposed order.

The present invention is described above in detail, but as a matter of course, it is apparent for those skilled in the art that the present invention is not limited to the embodiments described in this application. The present invention can be modified and embodied in other forms without departing from the intent and scope of the present invention defined by claims. Therefore, this application is intended to exemplarily describe the present invention, and has no limitation to the present invention.

This application is based on Japanese Laid-open Patent Publication No. 2015-164191 filed on Aug. 21, 2015. This application includes all of the contents.

The invention claimed is:

1. A user terminal comprising:
a control section for controlling communication using at least one of carrier aggregation and dual connectivity with a plurality of cells including at least a first cell and a second cell using a shorter transmission time interval (TTI) than a TTI of the first cell; and
a reception section for receiving information broadcasted from each of the first and second cells, wherein
the reception section receives a part of a plurality of system information blocks (SIBs) from the first cell, while receiving the others of the SIBs from the second cell.

2. The user terminal according to claim 1, wherein the information broadcasted from the first cell and the information broadcasted from the second cell are at least partly different from each other.

3. The user terminal according to claim 2, wherein the reception section detects common search space established in each of the first cell and the second cell.

4. The user terminal according to claim 2, wherein the control section limits the time to receive the information broadcasted from the second cell to a certain period.

5. The user terminal according to claim 2, wherein when the user terminal is in an idle state, the reception section receives the information broadcasted from the second cell.

6. The user terminal according to claim 1, wherein the reception section receives broadcast information corresponding to the first cell from the first cell, while receives the broadcast information corresponding to the first cell and broadcast information corresponding to the second cell from the second cell.

7. The user terminal according to claim 6, wherein the reception section detects common search space established in each of the first cell and the second cell.

8. The user terminal according to claim 6, wherein the control section limits the time to receive the information broadcasted from the second cell to a certain period.

9. The user terminal according to claim 1, wherein the reception section receives the same information from the first cell and the second cell.

10. The user terminal according to claim 9, wherein the reception section detects common search space established in each of the first cell and the second cell.

11. The user terminal according to claim 9, wherein the control section limits the time to receive the information broadcasted from the second cell to a certain period.

12. The user terminal according to claim 1, wherein the reception section detects common search space established in each of the first cell and the second cell.

13. The user terminal according to claim 12, wherein the control section limits the time to receive the information broadcasted from the second cell to a certain period.

14. The user terminal according to claim 1, wherein the control section limits the time to receive the information broadcasted from the second cell to a certain period.

15. The user terminal according to claim 1, wherein when the user terminal is in an idle state, the reception section receives the information broadcasted from the second cell.

16. A radio base station comprising:
a control section for controlling communication using carrier aggregation with a plurality of cells including at least a first cell and a second cell using a shorter transmission time interval (TTI) than a TTI of the first cell; and
a transmission section for broadcasting certain information from each of the first and second cells, wherein the transmission section broadcasts a part of a plurality of system information blocks (SIBs) from the first cell, while broadcasting the others of the SIBs from the second cell.

17. A radio communication method for a user terminal, comprising:

controlling communication using at least one of carrier aggregation and dual connectivity with a plurality of cells including at least a first cell and a second cell using a shorter transmission time interval (TTI) than a TTI of the first cell; and receiving information broadcasted from each of the first and second cells, wherein a part of a plurality of system information blocks (SIBs) is received from the first cell, while the others of the SIBs are received from the second cell.

* * * * *